(12) United States Patent
Iida et al.

(10) Patent No.: US 8,773,668 B2
(45) Date of Patent: Jul. 8, 2014

(54) DISPLACEMENT SENSOR

(75) Inventors: Yusuke Iida, Ayabe (JP); Hiroaki Takimasa, Ayabe (JP)

(73) Assignee: OMRON Corporation, Kyoto-Shi (JP)

( * ) Notice: Subject to any disclaimer, the term of this patent is extended or adjusted under 35 U.S.C. 154(b) by 0 days.

(21) Appl. No.: 13/636,003

(22) PCT Filed: Mar. 17, 2011

(86) PCT No.: PCT/JP2011/056346
§ 371 (c)(1),
(2), (4) Date: Feb. 1, 2013

(87) PCT Pub. No.: WO2012/032805
PCT Pub. Date: Mar. 15, 2012

(65) Prior Publication Data
US 2013/0201490 A1    Aug. 8, 2013

(30) Foreign Application Priority Data

Sep. 10, 2010   (JP) .................................. 2010-202953

(51) Int. Cl.
*G01B 11/14*     (2006.01)
*G01B 11/02*     (2006.01)
*G01S 7/491*     (2006.01)
*G01S 17/48*     (2006.01)

(52) U.S. Cl.
CPC ............. *G01B 11/026* (2013.01); *G01S 7/4918* (2013.01); *G01S 17/48* (2013.01)
USPC .......................................... 356/614; 702/150

(58) Field of Classification Search
CPC ........ G01B 11/14; G01B 11/026; G01B 7/14; G01S 17/48; G01S 7/4918; G01D 5/347
USPC .................. 356/601–623; 382/106, 201, 154; 702/150, 94, 57, 155
See application file for complete search history.

(56) References Cited

U.S. PATENT DOCUMENTS

2003/0067613 A1*   4/2003   Ishikawa et al. ............... 356/614
2003/0179387 A1*   9/2003   Uno et al. ...................... 356/624
(Continued)

FOREIGN PATENT DOCUMENTS

| JP | 63-154911 A | 6/1988 |
| JP | 06-109465 A | 4/1994 |

(Continued)

OTHER PUBLICATIONS

International Search Report mailed May 31, 2011 for Application No. PCT/JP2011/056346 (4 Pages).

*Primary Examiner* — Hoa Pham
(74) *Attorney, Agent, or Firm* — Nutter McClennen & Fish LLP; John J. Penny, V (57) ABSTRACT

A signal processing unit (C1, C2, C3) for processing a light reception signal from an imaging element (12) at different magnifications is provided in a light receiving unit (102) in a displacement sensor (1). This sensor (1) measures a displacement by using light receiving amount data generated by the signal processing unit (C1) for each detection processing by a light projecting unit (101) and the light receiving unit (102), and further adjusts sensitivity for next detection processing. In sensitivity adjustment processing, when a peak value in the light receiving amount data generated by the signal processing unit (C1) approximates to 0, a peak value extracted by the signal processing unit (C2) to which higher magnification is applied is employed. Alternatively, when a peak value in the light receiving amount data generated by the signal processing unit (C1) is saturated, a peak value extracted by the signal processing unit (C3) to which 1-fold magnification is applied is employed.

6 Claims, 7 Drawing Sheets

(56) References Cited

U.S. PATENT DOCUMENTS

2008/0221821 A1* 9/2008 Miller ........................... 702/94
2010/0232650 A1* 9/2010 Kanetani et al. ............. 382/106
2012/0303317 A1* 11/2012 Takimasa et al. ............ 702/150

FOREIGN PATENT DOCUMENTS

| JP | 2001-188005 A | 7/2001 |
| JP | 2001-280951 A | 10/2001 |
| JP | 2010-122127 A | 6/2010 |

* cited by examiner

DISPLACEMENT SENSOR

TECHNICAL FIELD

The present invention relates to a displacement sensor for measuring a displacement of an object through optical detection processing, and particularly to a displacement sensor having a function to adjust detection sensitivity while repeating detection processing and measurement processing.

BACKGROUND ART

A conventional displacement sensor includes a light projecting unit including a light emitting element such as a laser diode and a light receiving unit including a light receiving element such as a PSD, a CCD, and a CMOS, and repeatedly performs processing for emitting light to an object to be detected from the light projecting unit and receiving reflected light from the object to be detected (this process being referred to as "detection processing" herein) and processing for measuring a displacement of the object by using light receiving amount data generated by the light receiving unit. Triangulation which uses a position in a light receiving element on which reflected light is incident is often adopted as a measurement method. However, in addition thereto, a TOF (Time of Flight) method which uses a length of time from light projection to light reception, a phase difference ranging method which makes use of a phase difference between the projected light and the received reflected light, a PN code ranging method in which light subjected to intensity modulation with a PN code is projected and measurement using a result of correlation operation between that light and reflected light is conducted, and the like are available.

In addition, some conventional displacement sensors, being provided in a path where an object to be detected moves, have a function to adjust detection sensitivity in accordance with a state of reception of reflected light while it repeats detection processing and measurement processing. Patent Literature 1 (PTL 1) is exemplified as a literature showing that conventional example.

In the displacement sensor described in PTL 1, a laser diode is introduced as a light emitting element and a CCD is introduced as a light receiving element. An image signal output from the CCD is processed by an amplifier circuit or an AD conversion circuit and used for measurement processing.

This PTL 1 describes adjustment of a parameter (gain of the amplifier circuit, a time period and intensity of light emission from the laser diode, a shutter time of the CCD) for determining sensitivity for detection processing based on a calculated ratio between a peak value of a light receiving amount that appeared in an image (specifically, an average value of maximum values of density along horizontal lines) and an optimal value for that peak value.

In addition, according to the description in PTL 1, in the case where the peak value of the light receiving amount in the image has reached a saturation level, the peak value is estimated by calculation and a ratio of an optimal value for the peak value to an estimated value of the peak value is used to perform sensitivity adjustment processing, and in the case where the peak value is insufficient, sensitivity is reset to an initial state.

CITATION LIST

Patent Literature

PTL 1: Japanese Patent Laying-Open No. 2001-280951

SUMMARY OF INVENTION

Technical Problem

In a conventional displacement sensor having a sensitivity adjustment function, each time when detection processing is performed, a ratio between light receiving amount data obtained in the processing and an optimal value is calculated and sensitivity for next detection processing is adjusted based on that ratio. This adjustment method, however, is on the premise that reflected light having substantially the same intensity as previous reflected light is also incident on light receiving unit in next detection processing. If an object to be detected changes and a quantity of light incident on the light receiving unit significantly fluctuates, appropriate sensitivity adjustment becomes difficult.

The problem above will specifically be described with reference to FIG. 7.

Figure 7:
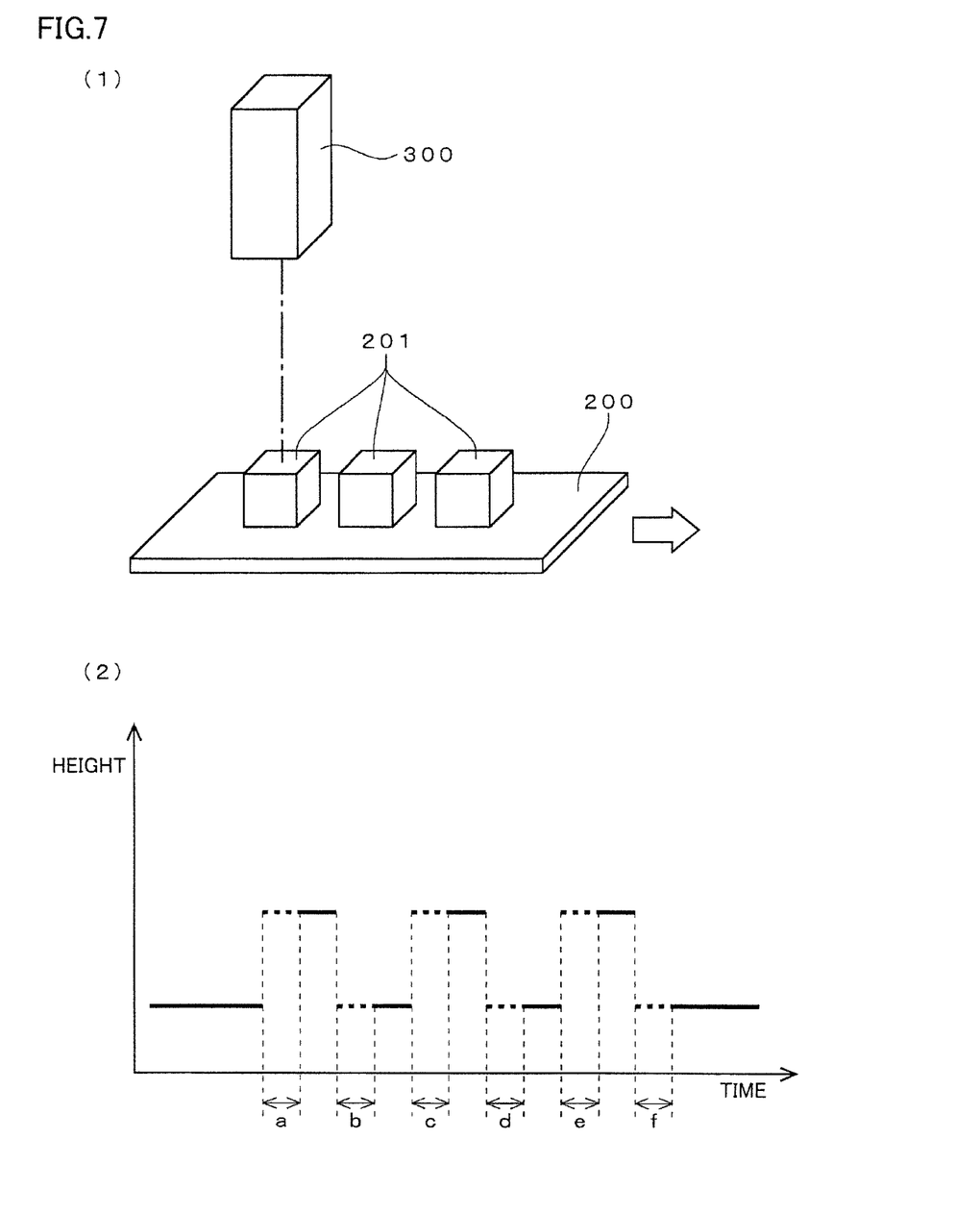
FIG. 7 is a graph showing a usage example of a conventional displacement sensor having a sensitivity adjustment function, together with problems caused in measurement with this sensor.

FIG. 7 (1) shows an example where a displacement sensor 300 is arranged above a conveying path where a substrate 200 on which a plurality of components 201 is mounted and the moving substrate 200 is subjected to measurement. FIG. 7 (2) shows in a graph, of a measurement value varying along a time axis obtained in the processing above. It is noted that a measurement value shown here is a value obtained by converting a distance from sensor 300 to an object to be detected to a height when viewed from a prescribed reference plane, with a portion in the graph where the value is low representing the measurement value in connection with substrate 200 and a portion in the graph where the value is high representing the measurement value in connection with component 201.

In this example, since substrate 200 and component 201 are significantly different from each other in reflectance, sensitivity adjusted immediately before will be inappropriate when the object to be detected by sensor 300 changes from substrate 200 to component 201 or the object to be detected changes from component 201 to substrate 200.

For example, when it is assumed that component 201 is higher in reflectance than substrate 200 and when the object to be detected is changed to component 201 while high sensitivity is set for adaptation to substrate 200, significantly increased reflected light is detected at high sensitivity and hence light receiving amount data may be saturated. Alternatively, when the object to be detected is changed to substrate 200 while low sensitivity is set for adaptation to component 201, a value for light receiving amount data becomes very low and hence it becomes difficult to recognize whether reflected light is incident or not.

When saturation or shortage in the light receiving amount data thus occurs, a ratio between the light receiving amount data and an optimal value cannot correctly be calculated and hence adjustment of sensitivity becomes difficult. Therefore, sensitivity adjustment over a plurality of cycles when required may lead to unstable measurement during that period or occurrence of a measurement error.

The graph in FIG. 7 (2) shows with an extra-thick solid line, measurement data obtained with sensitivity being appropriately adjusted, and shows with a dotted line, a measurement value that should theoretically be obtained during periods a, b, c, d, e, and f during which measurement becomes unstable or a measurement error is caused because of insufficient adjustment of sensitivity. As shown with these two types of lines, immediately after change in the object to be detected, measurement may become unstable due to inappropriate sensitivity. Therefore, as these periods a to e during which measurement is unstable are longer, it becomes difficult to correctly recognize variation in the shape of the surface of the substance. In addition, in the case where a substance moves at a high speed or in the case where a small substance is the object to be measured, the substance may move out of a detection area of sensor 300 while sensitivity is being adjusted and measurement may completely be missed.

According to the invention described in PTL 1, when the light receiving amount is saturated, the light receiving amount is estimated so as to adjust sensitivity, however, a result of estimation is not necessarily correct and it is likely that sensitivity cannot be quickly adjusted. In addition, even though resetting to initial sensitivity is made in the case where the light receiving amount is insufficient, it is less likely that a light receiving amount suitable for measurement is obtained. Therefore, the invention described in PTL 1 cannot completely solve the problems above.

The present invention pays attention to the problems above, and it is an object of the present invention to make such sensitivity adjustment that light receiving amount data promptly returns to an appropriate state even when saturation or shortage in the light receiving amount data to be used in measurement processing may occur due to change in the object to be detected or the like.

Solution to Problem

A displacement sensor according to the present invention includes a light projecting unit configured to project light for detection, a light receiving unit configured to receive reflected light from an object reflecting the light from the light projecting unit and generate light receiving amount data indicating a light receiving state thereof, a measurement unit configured to repeat detection processing by the light projecting unit and the light receiving unit and measure a displacement of the object using the light receiving amount data obtained by each detection processing, and a sensitivity adjustment unit configured to adjust sensitivity in the detection processing.

The light receiving unit includes a light receiving element and a plurality of signal processing units, each of the plurality of signal processing units generating the light receiving amount data by applying different magnifications to a light receiving amount signal output from the light receiving element. The measurement unit performs measurement processing of the displacement using the light receiving amount data generated by a specific signal processing unit of the plurality of signal processing units.

The sensitivity adjustment unit selects one of the light receiving amount data generated by the plurality of signal processing units according to the detection processing based on a prescribed rule. Then, the sensitivity adjustment unit determines a correlation between a value of the light receiving amount data generated by the specific signal processing unit and a predetermined appropriate value based on a ratio of a magnification applied to a signal processing unit generating the selected light receiving amount data to a magnification applied to the specific signal processing unit and the selected light receiving amount data, and adjusts sensitivity in subsequent detection processing based on the correlation. It is noted that a ratio or difference between the light receiving amount data and the appropriate value can be determined as the correlation.

According to the configuration above, by processing the light receiving amount signal output from the light receiving element with the plurality of signal processing units, the plurality of pieces of light receiving amount data to which different magnifications are applied respectively are generated. Since the light receiving amount data generated by the specific signal processing unit is used in measurement processing, each measurement result can be consistent and stable measurement can be conducted unless the light receiving amount data is saturated or greatly lowers.

On the other hand, in sensitivity adjustment processing, light receiving amount data generated by a signal processing unit other than the specific signal processing unit is selected, a correlation between a value of the light receiving amount data generated by the specific signal processing unit and the appropriate value is determined based on the ratio of the magnification applied to the selected signal processing unit to the magnification applied to the specific signal processing unit and the selected light receiving amount data, and sensitivity in next detection processing can be adjusted based on this relation. Therefore, even when saturation or shortage in the light receiving amount data generated by the specific signal processing unit occurs, sensitivity in subsequent detection processing can appropriately be adjusted by selecting light receiving amount data in which reflected light incident on the light receiving element is represented with the appropriate value.

It is noted that sensitivity adjustment above is desirably made for each detection processing, however, substantial sensitivity adjustment processing may be skipped during a period in which the light receiving amount data generated by the specific signal processing unit is within a prescribed numerical range including the appropriate value.

In one preferred embodiment of the displacement sensor above, when the value of the light receiving amount data generated by the specific signal processing unit is in a range from a prescribed acceptable value to a saturation level, the sensitivity adjustment unit selects the light receiving amount data. On the other hand, when the value of the light receiving amount data generated by the specific signal processing unit is lower than the prescribed acceptable value, the sensitivity adjustment unit selects light receiving amount data generated by a signal processing unit for which a magnification higher than that of the specific signal processing unit is set. Alternatively, when the value of the light receiving amount data generated by the specific signal processing unit reaches the saturation level, the sensitivity adjustment unit selects light receiving amount data generated by a signal processing unit to which a magnification lower than that of the specific signal processing unit is applied.

According to the configuration above, when a value of the light receiving amount data used for measurement processing can correctly be obtained, that light receiving amount data is selected to adjust sensitivity, so that the light receiving amount data can be maintained in an appropriate state. On the other hand, in the case where the light receiving amount data used in measurement processing is lower than the acceptable value or saturated and it is difficult to obtain a correct value of the light receiving amount data, appropriate sensitivity adjustment can be made by using light receiving amount data for which an appropriate value has been obtained as a result of signal processing at magnification different from that of the specific signal processing unit.

In another preferred embodiment, the sensitivity adjustment unit selects light receiving amount data closest to the appropriate value from the light receiving amount data generated by the plurality of signal processing units. By doing so, data most suitable for sensitivity adjustment among the plurality of pieces of light receiving amount data can be selected so as to make sensitivity adjustment of high accuracy.

The displacement sensor according to another preferred embodiment is provided with an imaging element having a plurality of pixels as the light receiving element. In addition, light receiving amount data representing light receiving amounts of all pixels of the imaging element is generated in the specific signal processing unit, and light receiving amount data representing at least a peak value of the light receiving amounts of the pixels of the imaging element is generated in other signal processing units.

The sensitivity adjustment unit determines correlation between a peak value of the light receiving amount data generated by the specific signal processing unit and the appropriate value based on a peak value of the selected light receiving amount data and the ratio of the magnification applied to the signal processing unit generating the selected light receiving amount data to the magnification applied to the specific signal processing unit. In addition, the measurement unit specifies a position where the peak value of the light receiving amount is obtained in the imaging element using the light receiving amount data generated by the specific signal processing unit, and measures the displacement based on the specified position.

According to the configuration above, light receiving amount data in which the peak value of the light receiving amount indicates appropriate intensity is selected from the plurality of pieces of light receiving amount data so as to perform sensitivity adjustment processing, so that a peak value in the light receiving amount data generated by the specific signal processing unit can be adjusted to sufficient magnitude. Therefore, a position in the imaging element corresponding to this peak value can accurately be specified and high-accuracy displacement measurement can be conducted.

Advantageous Effects of Invention

According to the present invention, adjustment processing can be performed in such a manner that a plurality of pieces of light receiving amount data to which different magnifications are applied are generated from a light receiving amount signal output from a light receiving element and data suitable for adjustment of sensitivity is selected from these pieces of light receiving amount data. Therefore, even though light receiving amount data suitable for measurement can no longer be obtained with sensitivity adjusted immediately before due to change in the object to be detected or the like, sensitivity can promptly be changed so that the light receiving amount data can be recovered to an appropriate state. Therefore, even in the case where a substance moving at a high speed or a small substance is to be detected, measurement processing can be performed without any difficulty.

DESCRIPTION OF EMBODIMENTS

Figure 1:
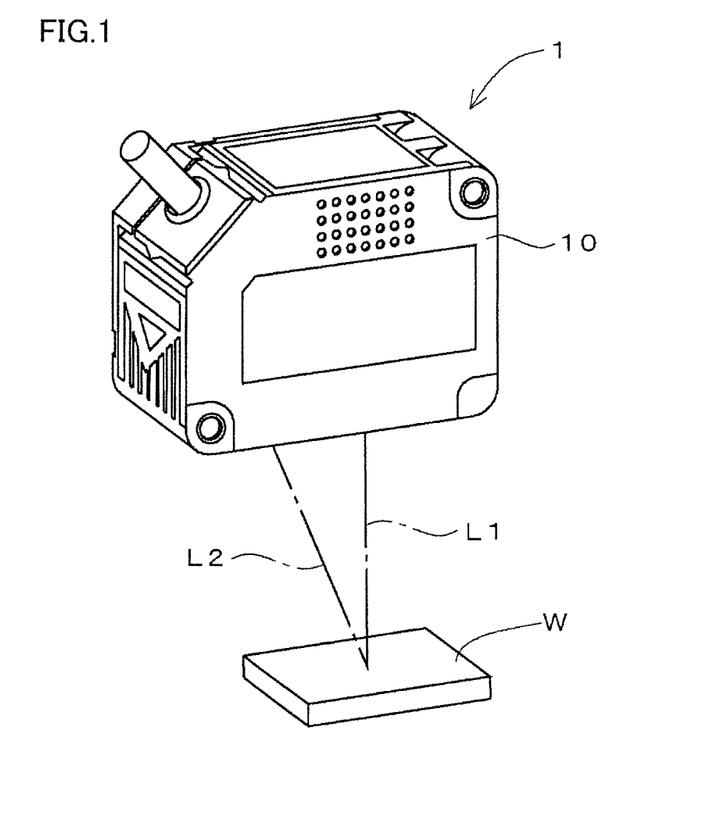
FIG. 1 is a perspective view showing appearance and a state of use of a displacement sensor.

FIG. 1 shows appearance and a state of use of a displacement sensor to which the present invention is applied.

A displacement sensor 1 in this embodiment projects a laser beam L1 to a workpiece W to be detected and receives reflected light L2 of this laser beam L1 from workpiece W, and measures a distance from sensor 1 to a surface of workpiece W as a displacement based on principles of triangulation. For this processing, in a housing 10 of sensor 1, a control substrate on which a light emitting element 11 and an imaging element 12 as well as a processing circuit shown in FIG. 2 are mounted and the like are provided.

Figure 2:
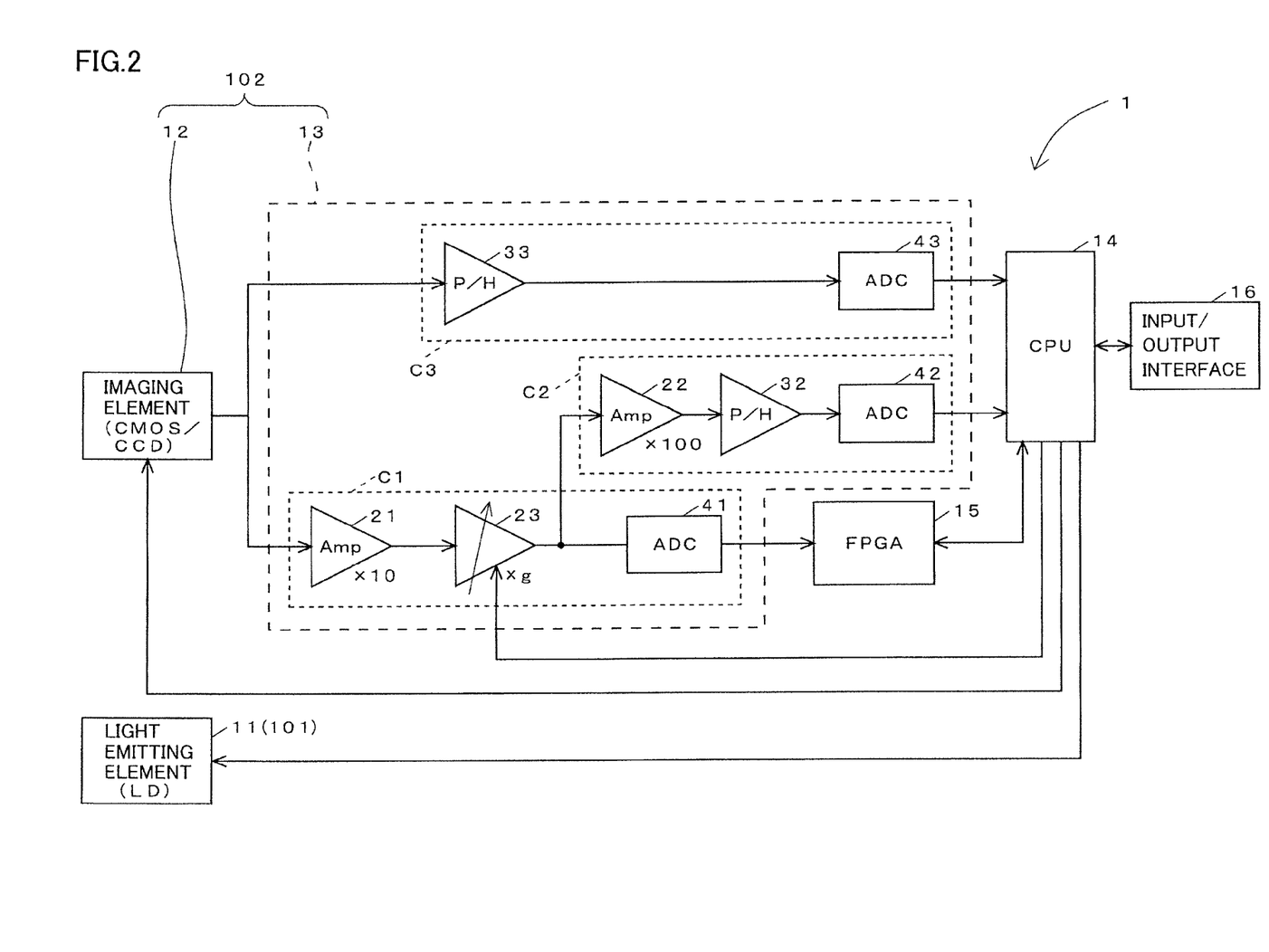
FIG. 2 is a block diagram showing a circuit configuration of the sensor according to a first embodiment.

FIG. 2 shows a main circuit configuration of displacement sensor 1 above.

A light projecting unit 101 of this displacement sensor 1 includes a laser diode as light emitting element 11. Additionally, light projecting unit 1 includes a lens for light projection and a drive circuit for light emitting element 11, both of which are not shown. A light receiving unit 102 includes a light-reception lens (not shown), two-dimensional imaging element 12 (a CMOS or a CCD being employed), and a light receiving circuit 13 for processing an image signal output from imaging element 12 (hereinafter referred to as a "light receiving amount signal" because it will be an image indicating a light receiving amount of reflected light).

Light receiving circuit 13 is mounted on the control substrate described previously. Additionally, a CPU 14 (integrated into one chip together with a memory), an FPGA (Field Programmable Gate Array) 15, an input/output interface 16, and the like are mounted on the control substrate.

Light receiving circuit 13 includes three signal processing units C1, C2, C3.

An output line from imaging element 12 is split into two, and one line is connected to signal processing unit C1 and the other line is connected to signal processing unit C3.

Signal processing unit C1 includes amplifiers 21, 23 and an AD conversion circuit 41. Gain of amplifier 21 is set to approximately 10-fold. Amplifier 23 is a variable gain amplifier, and it can vary gain g in a range from 1-fold to 100-fold. A light receiving amount signal output from each pixel in imaging element 12 is guided to AD conversion circuit 41 after amplification by these amplifiers 21, 23 and subjected to digital conversion. Thus, an image representing light receiving states in all pixels in imaging element 12 is generated. This image is input to FPGA 15.

An output line from variable gain amplifier 23 to AD conversion circuit 41 is branched, and signal processing unit C2 is connected to that branched line.

Signal processing unit C2 includes an amplifier 22, a peak holding circuit 32, and an AD conversion circuit 42. Gain of amplifier 22 is set to approximately 100-fold. A light receiving amount signal amplified by amplifiers 21, 23 in signal processing unit C1 is further amplified by this amplifier 22 and then input to peak holding circuit 32. The light receiving amount signal at the maximum level held by peak holding circuit 32 is subjected to digital conversion by AD conversion circuit 42. A peak value extracted by this conversion processing is input to CPU 14.

Signal processing unit C3 includes a peak holding circuit 33 and an AD conversion circuit 43. To peak holding circuit 33, a light receiving amount signal output from each pixel in imaging element 12 is input without being amplified. The light receiving amount signal at the maximum level held by peak holding circuit 33 is subjected to digital conversion by AD conversion circuit 43. A peak value extracted in this conversion processing is also input to CPU 14.

It is noted that AD conversion circuits 42, 43 in signal processing units C2, C3 respectively can also be integrated on a chip commonly to CPU 14.

According to the configuration above, a value indicated by an image generated in the processing in signal processing unit C1 and input to FPGA 15 is (10×g) times as high as the original value (the light receiving amount output from imaging element 12). Meanwhile, the peak value extracted by signal processing unit C2 is (1000×g) times as high as the original value. On the other hand, the peak value extracted by signal processing unit C3 indicates the original value as it is. Namely, the magnification is 1-fold.

CPU 14 controls an operation of light emitting element 11 and imaging element 12 and performs processing for varying gain g of variable gain amplifier 23. In addition, CPU 14 performs processing for input from and output to the outside through input/output interface 16.

FPGA 15 processes an image input from AD conversion circuit 41 in signal processing unit C1, specifies a coordinate of a position in the image where the peak value of the light receiving amount is produced, and measures a displacement of workpiece W based on the coordinate. In the processing for specifying the position of the peak value, for example, for each line along a direction in which a position in the image where reflected light is incident fluctuates, a coordinate of a peak position of the light receiving amount on that line is extracted and an average value of these coordinates is calculated. Further, with regard to the peak value, an average value or a maximum value of the peak value for each line can be calculated.

A result of measurement by FPGA 15 is output to CPU 14 and further output from CPU 14 through input/output interface 16 to an external device, a display unit, or the like, which is not shown.

Displacement sensor 1 configured as above adopts as parameters for sensitivity adjustment, gain g of variable gain amplifier 23 within light receiving circuit 13, as well as light emission intensity q of light emitting element 11 and an exposure time t in detection processing. In this embodiment, a period during which light emitting element 11 is caused to emit light and an exposure period of imaging element 12 are synchronized with each other, and a length of the period is defined as exposure time t.

Figure 3:
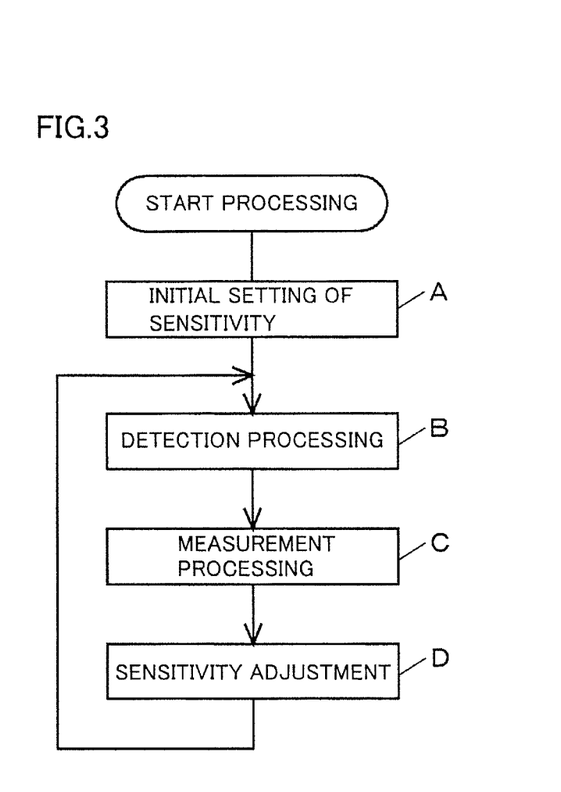
FIG. 3 is a flowchart showing an operation procedure of the sensor.

FIG. 3 shows a flow of operation in displacement sensor 1 above.

This processing is started as power of sensor 1 is turned on and CPU 14 and FPGA 15 are started up. Initially, in a first step A, initial setting of each parameter g, q, t involved with sensitivity adjustment is made by CPU 14. Thereafter, an endless loop of steps B, C, D is repeated through cooperation between CPU 14 and FPGA 15.

In step B, operations of light emitting element 11 and imaging element 12 are controlled based on parameters q and t and detection processing (light projection and light reception) is performed. In response, each signal processing unit C1, C2, C3 in light receiving circuit 13 operates, so that image data is input to FPGA 15 and two types of peak values are input to CPU 14.

In step C, a peak value is extracted from the image generated in step B above, and a coordinate of that peak value is used to measure a displacement. It is noted that this measurement processing includes also processing for outputting a result of measurement by CPU 14.

In step D, sensitivity in next detection processing is adjusted. Specifically, when the peak value used in measurement processing in immediately preceding step C is out of a predetermined appropriate range, a ratio V of an optimal value R to that peak value is calculated. Then, each parameter g, q, t is adjusted such that intensity of an image input to FPGA 15 in next detection processing increases or decreases by an amount corresponding to ratio V. For this adjustment processing, a table in which values for ratios V for sensitivity adjustment (hereinafter referred to as "sensitivity adjustment value V") are divided into a plurality of numerical ranges and a specific adjustment value for each parameter g, q, t is associated with each range is provided in an internal memory of CPU 14.

In principle, sensitivity adjustment value V above is calculated by using a peak value used for measurement processing (a value extracted from an image input from signal processing unit C1 to FPGA 15). When intensity of reflected light abruptly changes immediately after change in the object to be detected or the like, however, with sensitivity setting so far, a peak level input to AD conversion circuit 41 may be a value close to 0 or may exceed a maximum value of AD conversion (saturation) to the contrary, which makes it difficult to calculate sensitivity adjustment value V. Then, in this embodiment, not only a peak value extracted from an image for measurement generated by signal processing unit C1 but also a peak value at high magnification extracted by signal processing unit C2 and a peak value at low magnification extracted by signal processing unit C3 are used to calculate sensitivity adjustment value V.

Here, a peak value extracted from an image generated by signal processing unit C1 is defined as a reference value P1 (hereinafter referred to as a "reference peak value P1") and a peak value extracted by signal processing unit C2 is denoted as P2. Then, according to the circuit configuration shown in FIG. 2, peak value P2 is approximately 100 times as high as reference peak value P1. Therefore, even when reference peak value P1 attains to a value close to 0, peak value P2 indicates a value high to some extent and hence this peak value P2 can be used for calculating sensitivity adjustment value V.

Further, a peak value extracted by signal processing unit C3 is denoted as P3. Then, this peak value P3 corresponds to a peak value of a light receiving amount signal before amplification. Therefore, when peak value P3 of the light receiving amount before amplification does not reach a saturation level in spite of saturation of reference peak value P1 in the image generated by signal processing unit C1, this peak value P3 can be used for calculating a sensitivity adjustment value.

Figure 4:
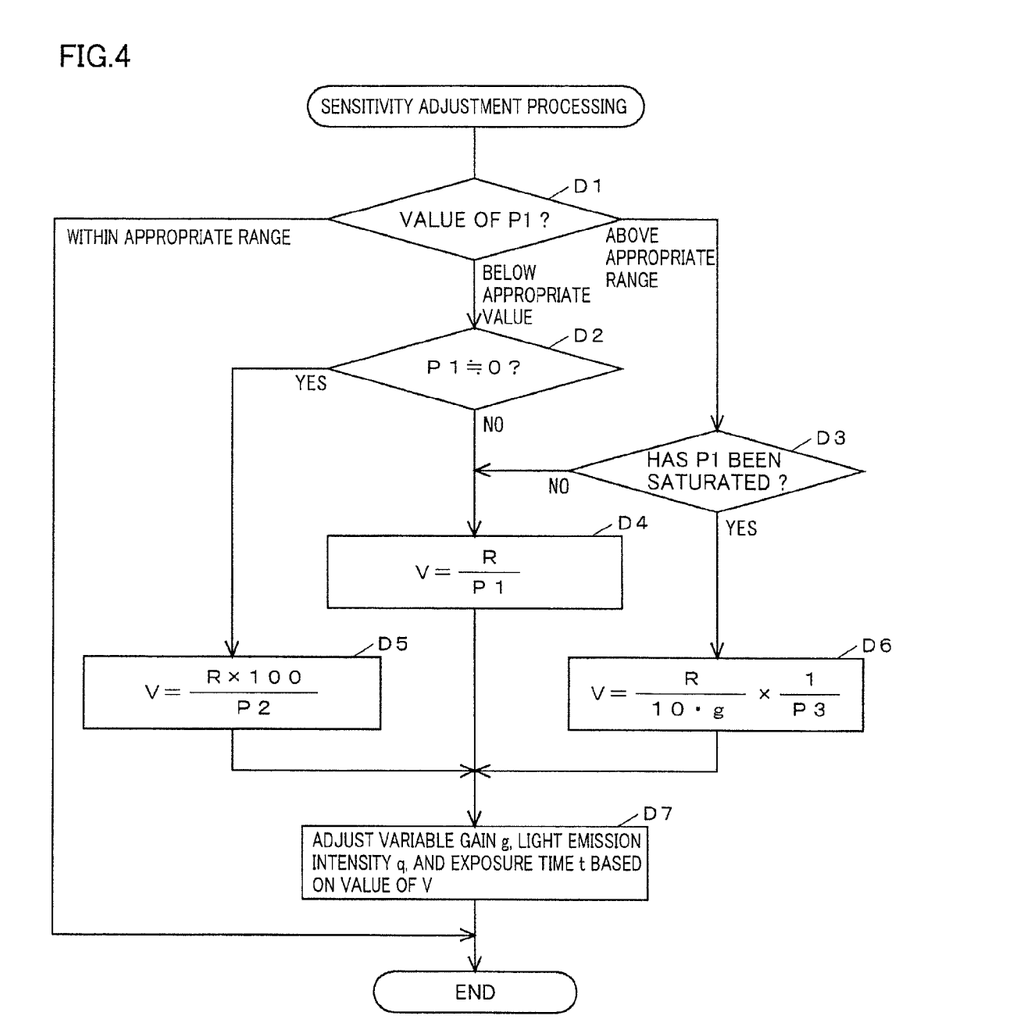
FIG. 4 is a flowchart showing a procedure of sensitivity adjustment processing according to the first embodiment.

FIG. 4 shows a detailed procedure of sensitivity adjustment processing (step D).

In the internal memory of CPU 14 in this embodiment, for sensitivity adjustment processing, a numerical range (including optimal value R) indicating an appropriate range of reference peak value P1 has been registered. In a step D1, reference peak value P1 used for immediately preceding measurement processing is compared with this appropriate range, and when P1 is out of the appropriate range, sensitivity adjustment processing is performed.

When a value of reference peak value P1 is below the appropriate range, adjustment for enhancing sensitivity for next detection processing (raising a level of a signal input to AD conversion circuit 41) is required. In this case, unless reference peak value P1 is a value approximating to 0 (for example, P1≥1), the process proceeds from a step D2 to a step D4.

In step D4, a ratio R/P1 of optimal value R to reference peak value P1 is calculated and this value is adopted as sensitivity adjustment value V. Thereafter, the process proceeds to a step D7, and each parameter of variable gain g, light emission intensity q, and exposure time t is adjusted based on sensitivity adjustment value V.

On the other hand, when reference peak value P1 approximates to 0, the process proceeds from step D2 to a step D5. In this step D5, optimal value R is converted to a value (R×100) in accordance with a level of peak value P2 and a ratio of the resultant optimal value to peak value P2 is calculated, to thereby calculate sensitivity adjustment value V.

Thereafter, the process proceeds to step D7, and each parameter g, q, t is adjusted based on sensitivity adjustment value V.

When a value of reference peak value P1 is above the appropriate range, adjustment for lowering sensitivity for next detection processing (lowering a level of a signal input to AD conversion circuit 41) is required. When reference peak value P1 is not saturated, the process proceeds from a step D3 to step D4 and sensitivity adjustment value V is calculated based on an operational expression V=R/P1 described previously. Then, the process proceeds to step D7 and each parameter g, q, t is adjusted.

On the other hand, when reference peak value P1 is saturated, the process proceeds from step D3 to a step D6. In this step D6, as a result of such an operation as converting optimal value R to a value (R/(10×g)) in accordance with a level of peak value P3 and calculating a ratio of the optimal value to peak value P3, sensitivity adjustment value V is calculated. Thereafter, the process proceeds to step D7 and each parameter g, q, t is adjusted based on sensitivity adjustment value V.

According to the processing above, even in the case where a correct value cannot be obtained because reference peak value P1 is saturated or approximates to 0, when another peak value P2, P3 appropriately indicates a value corresponding to reference peak value P1, sensitivity adjustment value V can accurately be calculated in step D5 or step D6. Therefore, when next detection processing is performed by using parameter g, q, t adjusted based on this sensitivity adjustment value V, a reference peak in an image input to FPGA 15 can be within an appropriate range.

According to displacement sensor 1 above, for example, even at a site where a plurality of types of workpieces different in reflectance are carried at a high speed, sensitivity can promptly be changed in response to change in workpiece to be detected and an image suitable for measurement can be input to FPGA 15. Therefore, accurate measurement processing can be performed as workpiece W moves. In addition, in the case where a workpiece which is a substance integrated but having a plurality of parts different in reflectance is to be measured, as in the case of substrate 200 and component 201 shown in FIG. 7 as well, sensitivity can similarly be changed promptly in response to change in reflectance of a part to be detected and therefore measurement data suitable for recognition of a surface shape can be obtained. Moreover, in the case where a small moving substance is to be detected as well, sensitivity can promptly be adjusted when that substance is to be detected, and hence missing of measurement can be eliminated.

According to the procedure in FIG. 3, in displacement sensor 1 in this embodiment, sensitivity adjustment processing (step D) is performed after detection processing (step B) and measurement processing (step C), however, sensitivity adjustment processing may be performed before measurement processing. Alternatively, processing may be performed in parallel in such a manner that FPGA 15 performs measurement processing and CPU 14 performs sensitivity adjustment processing.

Further, in displacement sensor 1 in the embodiment above, the light receiving amount data of all pixels is input to FPGA 15 and reference peak value P1 and a coordinate thereof are extracted in order to accurately measure a displacement, whereas other peak values P2, P3 are extracted by using peak holding circuits 32, 33 respectively. This is because the fact that a processing speed is lower in CPU 14 than in FPGA 15 is taken into account. Alternatively, signal processing units C2, C3 may also perform AD conversion processing of all pixels and a generated image may be guided to FPGA 15, so that peak values P2, P3 are extracted.

Figure 5:
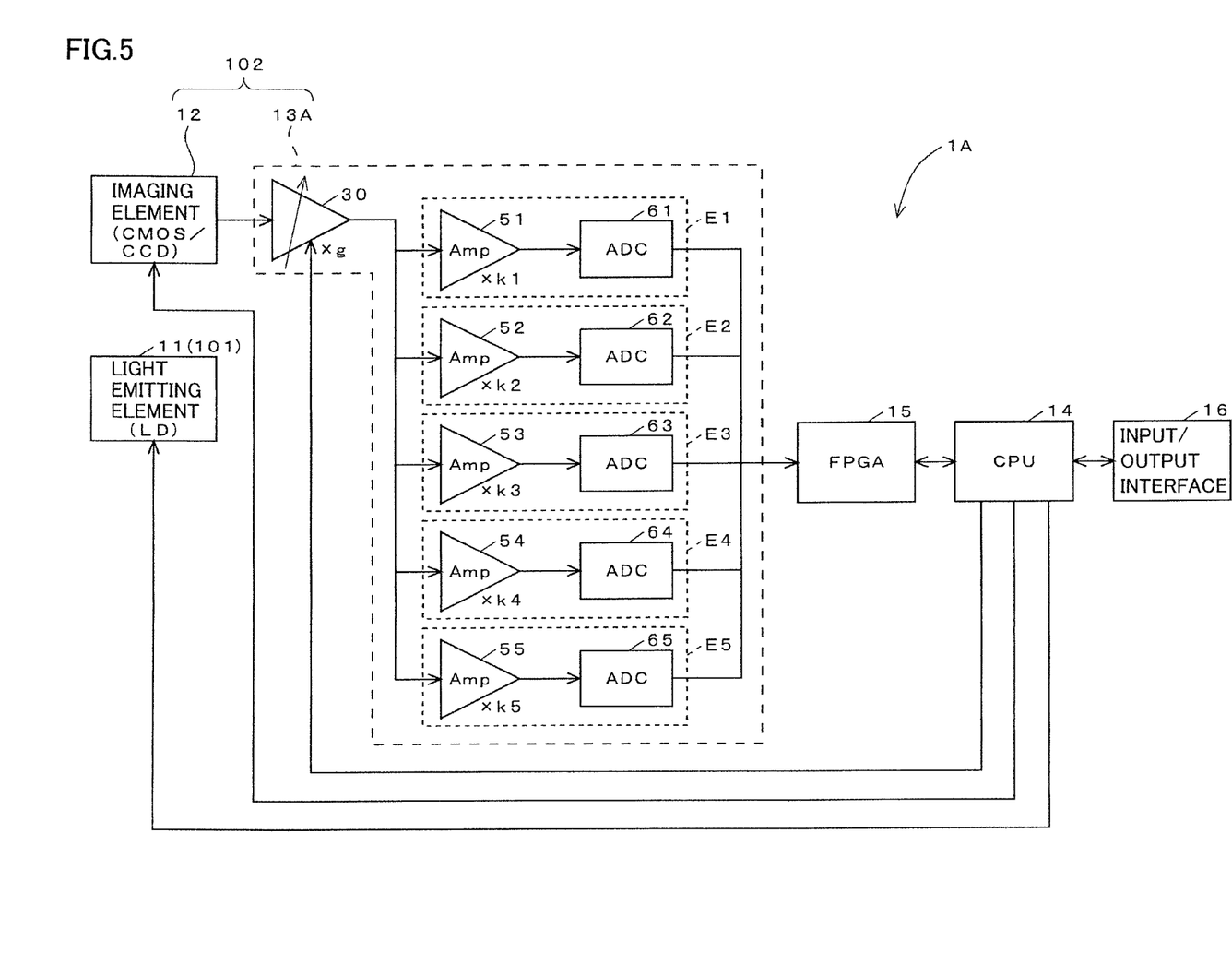
FIG. 5 is a block diagram showing a circuit configuration of a sensor according to a second embodiment.

FIG. 5 shows a circuit configuration of a second displacement sensor 1A to which the present invention is applied.

Sensor 1A in this embodiment also includes light projecting unit 101 including light emitting element 11, light receiving unit 102 including imaging element 12, CPU 14, FPGA 15, and input/output interface 16, as in the example in FIG. 2. It is noted that light receiving unit 102 is provided with a light receiving circuit 13A different in configuration from the previous example.

Specifically, light receiving circuit 13A in this embodiment includes a variable gain amplifier 30 receiving an output from imaging element 12 and five signal processing units E1, E2, E3, E4, E5 interposed between variable gain amplifier 30 and FPGA 15 in parallel.

Signal processing units E1 to E5 are constituted of amplifiers 51 to 55 and AD conversion circuits 61 to 65 respectively. Though gains k1, k2, k3, k4, k5 of respective amplifiers 51 to 55 are fixed, gain k1 of amplifier 1 is the lowest and gain is greater in the order of k2, k3, k4, and k5.

As in the first embodiment, CPU 14 controls operations of light emitting element 11 and imaging element 12. In addition, CPU 14 varies gain g of variable gain amplifier 30 and performs processing for input from and output to the outside through input/output interface 16.

A light receiving amount signal output from each pixel in imaging element 12 is input to each of signal processing units E1 to E5 through variable gain amplifier 30 and processed by each of amplifiers 51 to 55 and AD conversion circuits 61 to 65. Thus, five images different in amplitude of a waveform of the light receiving amount are input to FPGA 15.

FPGA 15 performs processing for measuring a displacement by using an image from signal processing unit E3 to which gain k3 at an intermediate position is applied, among the five input images above. This measurement result is output to CPU 14 and further output from CPU 14 through input/output interface 16 to an external device or the like.

Figure 6:
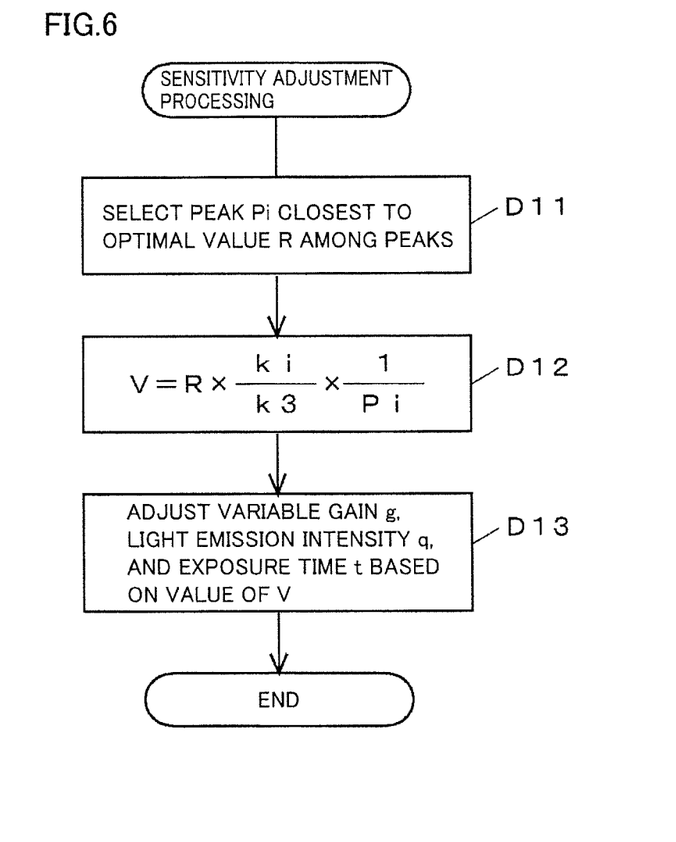
FIG. 6 is a flowchart showing a procedure of sensitivity adjustment processing according to the second embodiment.

FPGA 15 extracts a peak value also for an image from another signal processing unit E1, E2, E4 or E5. Further, CPU 14 and FPGA 15 cooperate with each other to thereby perform sensitivity adjustment processing in a procedure as shown in FIG. 6.

In a first step D11 in this processing, a peak Pi closest to optimal value R of a peak value for measurement (i being any of 1, 2, 3, 4, and 5) is selected from peaks extracted from the images generated from signal processing units E 1 to E5.

In a next step D12, selected peak value Pi and optimal value R, magnification ki applied to a signal processing unit Ei corresponding to peak value Pi, and magnification k3 applied to the signal processing unit corresponding to peak value P3 are used to execute an operational expression V=R×(ki/k3)×(1/Pi).

In this embodiment, optimal value R is an optimal value for peak P3 used for measurement. The operational expression above is for converting optimal value R to a level corresponding to peak value Pi and then calculating a ratio of the resultant optimal value to Pi. Therefore, even in the case where peak value P3 used for immediately preceding measurement processing is saturated or close to 0 and hence it is difficult to correctly specify that value, sensitivity adjustment value V suitable for setting a current light receiving state to an appropriate light receiving state can be obtained through the operation above.

In a step S103, based on this sensitivity adjustment value V, each parameter of gain g of variable gain amplifier 30, light emission intensity q of light emitting element 11, and exposure time t is adjusted. Thus, in next detection processing, peak value P3 in the image from signal processing unit E3 can be in a state close to optimal value R.

It is noted that, in the procedure in FIG. 6, regardless of whether peak value P3 is within an appropriate range or not, steps D12 and D13 are always performed. In this case as well, however, whether peak value P3 is within an appropriate range or not may initially be checked, and when P3 is within the appropriate range, steps D12 and D13 may be skipped.

In addition, in the case where peak value P3 is not compared with the appropriate range as well, when peak value P3 is around optimal value R, peak value P3 is selected in step D11 and sensitivity adjustment value V calculated in step D12 will be a value close to 1. Therefore, based on the fact that difference of sensitivity adjustment value V from value 1 is between prescribed acceptable values, step D13 may be skipped.

Though five signal processing units are provided in light receiving circuit 13A in the circuit configuration in FIG. 5, the number of the signal processing units is not limited thereto and any number of signal processing units, which is equal to or greater than 3, may be provided. The signal processing unit of which gain is set at an intermediate position thereamong can be used for measurement, and sensitivity can be adjusted with the same method as above. Moreover, though all signal processing units E1 to E5 are configured to amplify a light receiving amount signal of each pixel and then to subject the signal to AD conversion in the embodiment above, a signal processing unit configured such that a light receiving amount signal from imaging element 12 is directly input and subjected to digital conversion without being amplified (a signal processing unit to which 1-fold magnification is applied) may be provided.

Further, displacement sensors 1, 1A in the two embodiments above conduct measurement based on principles of triangulation by using a position where a peak value of a light receiving amount appears. In a sensor for measuring a displacement based on principles different therefrom as well, a plurality of signal processing units to which different magnifications are applied can process a light receiving amount signal output from a light receiving element, particular data in the light receiving amount data generated by each signal processing unit can be used for measurement, the light receiving amount data indicating an appropriate light receiving amount can be selected, and an operation for calculating a sensitivity adjustment value can be performed. By doing so, even though measurement fails because an appropriate light receiving amount could not be obtained immediately after change in the object to be detected, light receiving amount data other than the light receiving amount data used for that measurement can be used for appropriately adjusting sensitivity for next detection processing and hence such a state that measurement can be conducted can promptly be recovered. Therefore, even in the case where an object moves at a high speed or a small object is to be measured, sensitivity in accordance with each object can quickly be set and measurement can be conducted.

REFERENCE SIGNS LIST 1, 1A displacement sensor; 11 light emitting element; 12 imaging element; 13, 13A light receiving circuit; 14 CPU; 15 FPGA; 101 light projecting unit; 102 light receiving unit; and C1 to C3, E1 to E5 signal processing unit.

The invention claimed is:

1. A displacement sensor, comprising:
a light projecting unit configured to project light for detection;
a light receiving unit configured to receive reflected light from an object reflecting the light from the light projecting unit, and generate light receiving amount data indicating a light receiving state thereof;
a measurement unit configured to repeat detection processing by said light projecting unit and said light receiving unit and measure a displacement of the object using the light receiving amount data obtained by each detection processing; and
a sensitivity adjustment unit configured to adjust sensitivity in said detection processing, wherein
said light receiving unit includes a light receiving element and a plurality of signal processing units, each of said plurality of signal processing units generating said light receiving amount data by applying different magnifications to a light receiving amount signal output from the light receiving element,
said measurement unit performs measurement processing of said displacement using the light receiving amount data generated by a specific signal processing unit of said plurality of signal processing units, and
said sensitivity adjustment unit selects one of the light receiving amount data generated by said plurality of signal processing units according to said detection processing based on a prescribed rule, determines a correlation between a value of the light receiving amount data generated by said specific signal processing unit and a predetermined appropriate value based on a ratio of a magnification applied to a signal processing unit generating said selected light receiving amount data to a magnification applied to said specific signal processing unit and the selected light receiving amount data, and adjusts sensitivity in subsequent detection processing based on the correlation.

2. The displacement sensor according to claim 1, wherein
when the value of the light receiving amount data generated by said specific signal processing unit is in a range from a prescribed acceptable value to a saturation level, said sensitivity adjustment unit selects the light receiving amount data,
when the value of the light receiving amount data generated by said specific signal processing unit is lower than said prescribed acceptable value, said sensitivity adjustment unit selects light receiving amount data generated by a signal processing unit to which a magnification higher than that of the specific signal processing unit is applied, and
when the light receiving amount data generated by said specific signal processing unit reaches said saturation level, said sensitivity adjustment unit selects light receiving amount data generated by a signal processing unit to which a magnification lower than that of the specific signal processing unit is applied.

3. The displacement sensor according to claim 2, wherein
an imaging element having a plurality of pixels is provided as said light receiving element,
light receiving amount data representing light receiving amounts of all pixels of said imaging element is generated in said specific signal processing unit, and light receiving amount data representing at least a peak value of the light receiving amounts of the pixels of said imaging element is generated in other signal processing units, said sensitivity adjustment unit determines a correlation between a peak value of the light receiving amount data generated by said specific signal processing unit and said appropriate value based on a peak value of the selected light receiving amount data and the ratio of the magnification applied to the signal processing unit generating said selected light receiving amount data to the magnification applied to said specific signal processing unit, and said measurement unit specifies a position where the peak value of the light receiving amount is obtained in said imaging element using the light receiving amount data generated by said specific signal processing unit, and measures said displacement based on the specified position.

4. The displacement sensor according to claim 1, wherein said sensitivity adjustment unit selects light receiving amount data closest to said appropriate value from the light receiving amount data generated by said plurality of signal processing units.

5. The displacement sensor according to claim 3, wherein an imaging element having a plurality of pixels is provided as said light receiving element, light receiving amount data representing light receiving amounts of all pixels of said imaging element is generated in said specific signal processing unit, and light receiving amount data representing at least a peak value of the light receiving amounts of the pixels of said imaging element is generated in other signal processing units, said sensitivity adjustment unit determines a correlation between a peak value of the light receiving amount data generated by said specific signal processing unit and said appropriate value based on a peak value of the selected light receiving amount data and the ratio of the magnification applied to the signal processing unit generating said selected light receiving amount data to the magnification applied to said specific signal processing unit, and said measurement unit specifies a position where the peak value of the light receiving amount is obtained in said imaging element using the light receiving amount data generated by said specific signal processing unit, and measures said displacement based on the specified position.

6. The displacement sensor according to claim 1, wherein an imaging element having a plurality of pixels is provided as said light receiving element, light receiving amount data representing light receiving amounts of all pixels of said imaging element is generated in said specific signal processing unit, and light receiving amount data representing at least a peak value of the light receiving amounts of the pixels of said imaging element is generated in other signal processing units, said sensitivity adjustment unit determines a correlation between a peak value of the light receiving amount data generated by said specific signal processing unit and said appropriate value based on a peak value of the selected light receiving amount data and the ratio of the magnification applied to the signal processing unit generating said selected light receiving amount data to the magnification applied to said specific signal processing unit, and said measurement unit specifies a position where the peak value of the light receiving amount is obtained in said imaging element using the light receiving amount data generated by said specific signal processing unit, and measures said displacement based on the specified position.

* * * * *